US008688991B1

(12) United States Patent
Sunil

(10) Patent No.: US 8,688,991 B1
(45) Date of Patent: Apr. 1, 2014

(54) MEDIA PLAYER EMBODIMENTS AND SECURE PLAYLIST PACKAGING

(75) Inventor: Agrawal Sunil, Milpitas, CA (US)

(73) Assignee: Adobe Systems Incorporated, San Jose, CA (US)

(*) Notice: Subject to any disclaimer, the term of this patent is extended or adjusted under 35 U.S.C. 154(b) by 1062 days.

(21) Appl. No.: 11/757,085

(22) Filed: Jun. 1, 2007

(51) Int. Cl.
*H04L 9/32* (2006.01)
*H04L 9/00* (2006.01)
*H04L 9/30* (2006.01)
*H04N 7/173* (2011.01)
*G06F 15/16* (2006.01)

(52) U.S. Cl.
USPC ............... 713/176; 726/4; 725/116; 709/217; 709/231; 380/30; 705/51

(58) Field of Classification Search
USPC ........... 713/196, 156, 176; 705/1, 51; 380/30; 709/217, 231; 726/4; 725/116
See application file for complete search history.

(56) References Cited

U.S. PATENT DOCUMENTS

| 7,055,166 | B1 | 5/2006 | Logan et al. | |
|---|---|---|---|---|
| 7,080,139 | B1* | 7/2006 | Briggs et al. | 709/224 |
| 2002/0059144 | A1* | 5/2002 | Meffert et al. | 705/51 |
| 2002/0184047 | A1* | 12/2002 | Plotnick et al. | 705/1 |
| 2003/0018966 | A1* | 1/2003 | Cook et al. | 725/2 |
| 2003/0215211 | A1* | 11/2003 | Coffin, III | 386/46 |
| 2004/0249817 | A1* | 12/2004 | Liu et al. | 707/9 |
| 2005/0188415 | A1* | 8/2005 | Riley | 725/116 |
| 2006/0116966 | A1* | 6/2006 | Pedersen et al. | 705/59 |
| 2007/0168540 | A1* | 7/2007 | Hansson | 709/231 |
| 2008/0134297 | A1* | 6/2008 | Clinick et al. | 726/4 |
| 2011/0004669 | A1* | 1/2011 | Navar et al. | 709/217 |

OTHER PUBLICATIONS

Menezes (1991). Handbook of applied cryptography, Chapter 13 all pages.*
Potlapally (2002). Optical fingerprinting to protect data: a proposal. Retrieved from IEEE Xplore.*

* cited by examiner

*Primary Examiner* — Brian Shaw
(74) *Attorney, Agent, or Firm* — Kilpatrick Townsend & Stockton LLP

(57) ABSTRACT

A system identifies a playlist comprising at least one reference to content. The system provides a digital signature to the playlist. The digital signature links the playlist to a creator of the playlist. The system authenticates an application rendering the content using the digital signature. The system receives a command to render the playlist using the application.

16 Claims, 13 Drawing Sheets

204 IDENTIFY A PLAYLIST COMPRISING AT LEAST ONE REFERENCE TO CONTENT

205 IDENTIFY THE CONTENT IN THE PLAYLIST AS AN ADVERTISEMENT

OR

206 ENCRYPT THE CONTENT REFERENCED IN THE PLAYLIST USING A POLICY

*FIG. 4*

206 ENCRYPT THE CONTENT IN THE PLAYLIST USING A POLICY

207 PROVIDE A POLICY ALLOWING ANONYMOUS USER ACCESS TO THE CONTENT

OR

208 PROVIDE A POLICY REQUIRING AUTHENTICATION OF AN APPLICATION CAPABLE OF RENDERING THE CONTENT

209 PROVIDE AN IDENTIFICATION OF THE APPLICATION CAPABLE OF RENDERING THE CONTENT WITHIN THE POLICY

OR

210 COMPUTE AN ENCRYPTION KEY USING A CREDENTIAL PROVIDED TO A CREATOR OF THE PLAYLIST, THE ENCRYPTION KEY USED TO ENCRYPT THE CONTENT

*FIG. 5*

```
225 VERIFY THAT THE DIGITAL SIGNATURE OF THE PLAYLIST AUTHENTICATES
WITH A CREDENTIAL PROVIDED TO A CREATOR OF THE PLAYLIST

226 IDENTIFY THAT THE CONTENT IS STORED LOCALLY

↓

227 VERIFY A FIRST VALUE ASSOCIATED WITH THE CONTENT
    MATCHES A SECOND VALUE ASSOCIATED WITH THE CONTENT,
    THE SECOND VALUE INCLUDED IN THE DIGITAL SIGNATURE

OR

228 DETERMINE THAT AN AUTHENTICATION OF THE PLAYLIST
    HAS FAILED

↓

229 REJECT THE COMMAND TO RENDER THE CONTENT
```

*FIG. 9*

MEDIA PLAYER EMBODIMENTS AND SECURE PLAYLIST PACKAGING

BACKGROUND

Conventional computer systems allow for the production and distribution of multimedia data, including video, audio and image data. Such production is increasing at a phenomenal rate due to the growing popularity of the Internet, the growing affordability of personal computers capable of efficiently processing multimedia data to provide a pleasing experience for users, as well as the fact that multimedia data is far superior to text-only data in conveying content-rich information.

People now access and use multimedia data in numerous ways. One way that people access multimedia data is over a network. For example, people using web browsers on personal computers now access multimedia data by surfing the World Wide Web via the Internet. Countless numbers of content providers link multimedia data to web pages accessible by people using web browsers. Today, persons using web browsers can access a web page from a web server operated by a content provider to view video clips, listen to audio clips, or view images made available by the content provider.

When a client requests a piece of media content such as digital video, audio, or some other sampled content from a server, the client typically provides the global address of the content in the form of a Uniform Resource Locator (URL). A server then accesses the content and sends or "streams" it to the client as a continuous data stream.

There are various file formats for streaming media content and composite media streams. Regardless of the streaming file format used, an individual data stream may contain a sequence of digital data sets or units. The units can represent an image, sound, or some other stimuli that is perceived by a human to be continuously varying. The client can render the units individually, or in sequence, to reproduce the original stimuli. For example, a video data stream includes a sequence of digitally specified graphics frames that are rendered in sequence to produce a moving picture.

A playlist file, for conventional systems, can contain information such as whether to play certain pieces of media content more than one time, which pieces of media content to play, the order in which to play referenced media content, and the like. Playlist files also can contain references to one or more media streams and describe how pieces of media are to be combined. Playlists do not contain the actual media data, but rather references to the media data. As a result, playlist files are typically small, generally only containing text, and are generally easy and computationally inexpensive to modify. References to a single piece of media may appear in many playlist files.

Conventional playlist files have the effect of combining several individual pieces of media content into one single complex piece of content, and they are important to providers of streaming media. They allow content providers to combine advertisements with other content, and therefore build a business based on advertising revenue. They allow Internet radio stations to create a playlist of broadcast songs. They also allow providers to brand their content by attaching previews or radio-station identifiers before or after the content.

Conventional playlists are implemented either on a client or on a server such as when the client implements a playlist, the playlist is typically downloaded from a server such as a Web server, a file server, and/or the like. The client interprets the playlist file to present a series of requests to one or more servers to access at least a portion of the content represented in the playlist. A server is generally not aware whether the client is requesting content based on a corresponding reference in the currently executed client-side playlist file or whether the client obtains the reference from a source other than a playlist. This is because, from the server's perspective, use of a client-side playlist is indistinguishable from a client communicating a number of non-playlist generated requests to the server to play several different pieces of content one after the other.

SUMMARY

Conventional technologies for securing (e.g., providing security with respect to) playlists and/or corresponding content referenced by the playlists suffer from a variety of deficiencies. In particular, conventional technologies related to playlists are limited in that conventional technologies do not prevent viewers of content, for example, videos in the playlist, from bypassing advertisements when viewing videos within the playlist.

Typically, conventional playlists contain both videos and advertisements with the intent that viewers of the playlist will be exposed to advertisements when viewing the videos as referenced within the playlists. Advertisers pay to have advertisements placed within playlists. Such advertisers therefore want to ensure that viewers of the playlists view the advertisements when playing back content as specified by the playlist.

As mentioned above, conventional technologies have been used to embed or integrate the advertisements into corresponding videos to ensure that advertisements are viewed by a corresponding client that downloads the content for viewing. However, conventional playlists can be easily modified or created to contain references only to URLs of videos and not URLs of advertisements.

Also, technologically advanced viewers may attempt to create their own playlists from video references obtained from playlists. Conventional technologies do not provide the security to ensure the integrity of a playlist, nor do they prevent persons from utilizing references in the conventional playlist to bypass advertisements in a playlist for purposes of viewing only desirable video content.

Embodiments disclosed herein significantly overcome prior art deficiencies and provide a system, method, apparatus, etc. to execute or implement a packaging process that protects the integrity of one or more playlists and/or corresponding content by providing a bi-directional binding between the content as specified in a corresponding playlist and a creator of the playlist. Such embodiments can be used to ensure that the video content cannot be played outside the context of executing a corresponding playlist created by a publisher or author.

Additionally, embodiments herein can provide real time authentication of a video manager (e.g., a decryption process) and a corresponding media player application to ensure that only authorized video rendering applications are able to play the video(s) as specified within the playlist.

It should be noted that the use of the term content refers to data such as video data, audio data, etc. Example embodiments disclosed herein that reference video as an example of multimedia content are not intended to be limiting as embodiments herein can be applied to any type of content.

During creation of a playlist according to embodiments herein, a certification authority provides a credential to the playlist creator. For example, a certification authority provides a registered user (e.g., playlist creator) a corresponding public key and a private key. Thus, the certification authority can be an entity that issues digital certificates for use by parties such as the playlist creator.

In one embodiment, the playlist creator is also "tied" to an application that is capable of rendering the video for a corresponding viewer. For example, a playlist can contain one or more URLs referencing videos and advertisements. The videos (e.g., multimedia content as referenced) in the playlist can be encrypted via the playlist creator and/or use of a policy server.

In one embodiment, the policy server aids in security management. For example, the policy server supports a policy that is used during an encryption process for encrypting the videos as specified by references in the playlist. A policy can be, in effect, a rule or set of rules that are applied to the playlist. A policy is added to the encrypted videos allowing anonymous user access. The policy can require that the media player application (for viewing of the multimedia content), and the video manager (on which the media player application operates) be authenticated. In such an embodiment, the policy server provides a content encryption key that is processed with a public key contained within the credential provided to the playlist creator. Additionally, the policy server can return a content decryption key that is encrypted using the public key of the video manager. The content playback manager (e.g., video manager) maintains the corresponding private key to decrypt the encrypted key for decrypting content as referenced by pointers in the playlist.

In one embodiment, a digital signature can be added and/or associated with the playlist. Additionally, in an example embodiment, the processes as described herein can compute a value (e.g. a hash) for each encrypted video. The computed hash values for the video content can be embedded into the digital signature or included in the playlist.

In an example embodiment, since the advertisements may change depending on a respective user utilizing a playlist to play back multimedia content, hashes for certain referenced content such as advertisements may not be included in the digital signature, even though the playlist may include a number of URLs (e.g., URLs to advertisements) that are used when creating a corresponding digital signature associated with the playlist.

When attempting to execute the playlist, a respective software process can be used to verify the digital signature associated with the playlist. If the content as specified by the playlist is downloaded in real time over the network, the digital signature ensures that the URLs in the playlist haven't been modified by unauthorized parties. If the video has been downloaded and stored locally, the digital signature ensures that the hash of the (encrypted) video matches with the hash (of the encrypted video) that is embedded in the digital signature of the playlist.

Software processes associated with a media player can be used to communicate with a policy server to authenticate the media player application. The video manager verifies signature information associated with the media player application, and returns the signature information to the policy server. The policy server then verifies that the media player application matches the application specified in the policy.

The policy server also can verify that the version of the video manager is an acceptable version. For example, if the version of the video manager is determined to be an acceptable version by the policy server, the policy server can encrypt a content key with a video manager version key associated with the video manager (e.g., the video manager version key can be stored in the video manager), providing implicit authentication of the video manager. This real time authentication of the video manager and the application ensures that only desired application(s) are able to play the video and/or corresponding multimedia content. The video manager then decrypts the content key, and processes the content key with a public key associated with the digital signature to obtain one or more video decrypting keys. The one or more video decrypting keys can then be used to decrypt the videos (as specified by the playlist). Accordingly, the media player application operating on the video manager can play the video content obtained from a local or remote source.

If any of the validation steps fail, then the playlist is not rendered within the media player application operating on the video manager to playback the multimedia content as specified by the playlist.

Other embodiments disclosed herein include any type of computerized device, workstation, handheld or laptop computer, or the like configured with software and/or circuitry (e.g., a processor) to process any or all of the method operations disclosed herein. In other words, a computerized device such as a computer or a data communications device or any type of processor that is programmed or configured to operate as explained herein is considered an embodiment disclosed herein.

Other embodiments disclosed herein include software programs to perform the steps and operations summarized above and disclosed in detail below. One such embodiment comprises a computer program product that has a computer-readable medium including computer program logic encoded thereon that, when performed in a computerized device having a coupling of a memory and a processor, programs the processor to perform the operations disclosed herein. Such arrangements are typically provided as software, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained as embodiments disclosed herein.

Note also that embodiments herein include a computer readable media comprising a data structure for a playlist, the data structure comprising: a playlist including at least one reference to content; a signed certificate including security information for use by a media player application to render the content referenced by the playlist; and a digital signature for use by the media player application to verify the playlist prior to playback of content referenced by the playlist.

It is to be understood that the system disclosed herein may be embodied strictly as a software program, as software and hardware, or as hardware alone. The embodiments disclosed herein, may be employed in data communications devices and other computerized devices and software systems for such devices such as those manufactured by Adobe Systems Incorporated of San Jose, Calif.

BRIEF DESCRIPTION OF THE DRAWINGS

The foregoing will be apparent from the following description of particular embodiments disclosed herein, as illustrated in the accompanying drawings in which like reference characters refer to the same parts throughout the different views. The drawings are not necessarily to scale, emphasis instead being placed upon illustrating the principles disclosed herein.

FIG. 4 illustrates a flowchart of a procedure performed by the system of FIG. 1, when the playlist manager process identifies a playlist comprising at least one reference to content, identifying that content as an advertisement, according to embodiments herein.

FIG. 5 illustrates a flowchart of a procedure performed by the system of FIG. 1, when the playlist manager process encrypts the content in the playlist using a policy, according to embodiments herein.

FIG. 9 illustrates a flowchart of a procedure performed by the system of FIG. 1, when the content playback manager process verifies that the digital signature of the playlist authenticates with a credential provided to a creator of the playlist, according to embodiments herein.

DETAILED DESCRIPTION

Figure 1:
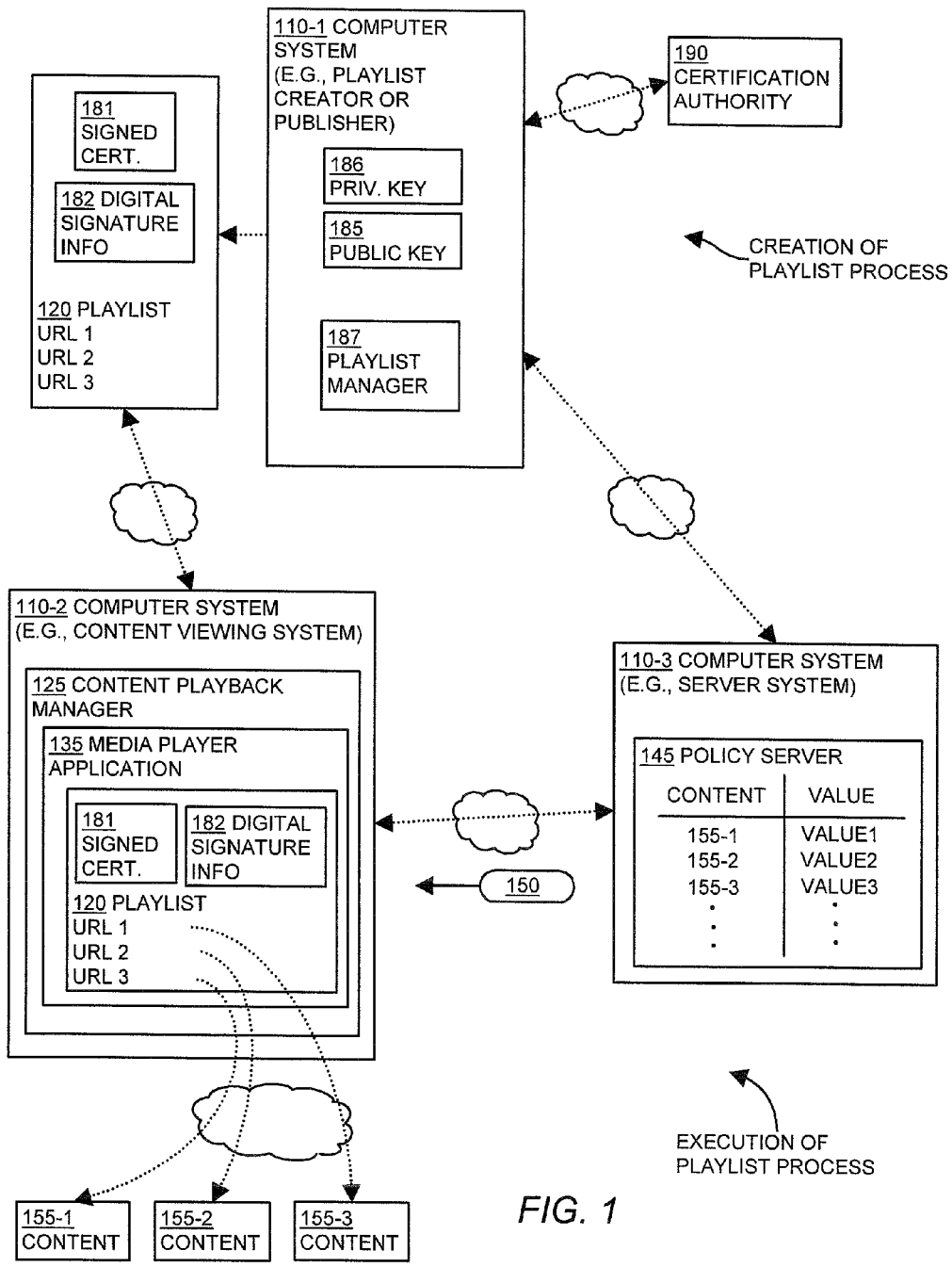
FIG. 1 shows a high level view of the media manager application according to embodiments herein.

FIG. 1 is an example diagram illustrating creation and playback of content according to embodiments herein. In general, computer system 110-1 can be operated by a corresponding user (such as a creator, publisher, author, etc.) to create one or more media files (e.g., so-called playlists) via playlist manager 187. As will be discussed in due course below, computer system 110-2 enables playback of content as specified in a corresponding playlist 120 via content playback manager 125 (i.e., a video manager) and/or media player application 135.

More specifically, to provide security with respect to a corresponding playlist 120 and/or content associated with a publisher, the publisher (e.g., one or more entities) associated with computer system 110-1 obtains a private key 186 and public key 185 from certification authority 190. Distribution of the public key 185 and the private key 186 can be contingent upon the publisher registering to create one or more playlists 120 with an appropriate authority distributing software such as playlist manager 187.

Based on information provided by a corresponding publisher, each playlist 120 produced by the publisher can specifically define a media playback experience. For example, a given playlist 120 can specify playback details such as what content to play to a user on playback, an order of when to play content as specified in the playlist to the user, which advertisements to play during playback, timing, animations, transitions, etc. In other words, the playlist 120 can include references (e.g., URLs, pointers, etc.) to locally or remotely stored content 155 (e.g., content 155-1, content 155-2, content 155-3, etc.) such as playable media content retrieved locally from computer system 110-2 or retrieved by computer system 110-2 from a remote source and played back on media player application 135. Accordingly, when executed, the playlist 120 can specify content from one or more different local or remote sources.

As discussed below, one way to reference content in a playlist is use of URLs that point to a location of corresponding content in a network although any suitable method for pointing to content can be used.

In one embodiment, playlists are created according to a markup language (e.g., an XML-based format such as Synchronized Multimedia Integration Language) in which tags are assigned to different matter included in the playlist 120. A corresponding media player uses the tagged information in the playlist 120 to interpret what content to play back and how to present it to a viewer.

Via playlist manager 187, each playlist 120 can include a signed certificate 181 associated with the publisher that creates the playlist 120. For example, the playlist manager 187 can create a signed certificate 181 associated with the publisher for inclusion and/or associated with the playlist 120.

The computer system 110-1 creates the signed certificate 181 via first applying a hash function to the publisher's public key 185 to produce a resulting hash value. The computer system 110-1 then applies a private key (e.g., Adobe's private key) associated with content playback manager 125 and/or media player application 135 to the resulting hash value (e.g., hashed public key value). As will be discussed below, the content playback manager 125 has Adobe's corresponding public key for decrypting signed certificate 181 to obtain the publisher's hashed public key value and/or the public key 185 associated with the publisher.

In addition to creation and inclusion of the signed certificate 181 in playlist 120, the publisher at computer system 110-1 can create and include digital signature information 182 associated with the playlist 120. For example, in one embodiment, the publisher creates the digital signature 182 by applying a hash function to the playlist 120 and, thereafter, encrypting the resulting value (i.e., the hashed playlist value) with private key 186 associated with the publisher. As further discussed below, content playback manager 125 can be encoded to include Adobe's corresponding public key to verify the signed certificate 181 during playback. Accordingly, creation of a digital signature for inclusion in a given playlist can include applying a private key 186 of the playlist creator to a calculated hashcode value derived from applying a hash function to the given playlist 120.

Note that both playlist manager 187 and content playback manager 125 can have access to (or be encoded with) the same hash functions. Also, the playlist manager 187, the content playback manager 125, and the media player application 135 may be combined as a single piece of software that supports creation as well as playback of playlists. Of course, the playlist manager 187 and the content playback manager 125 can be maintained as separate pieces of code for execution on respective computer systems.

The above disclosure describes creation of a playlist 120 for defining a viewing experience. Note that playlist manager 187 can provide an added level of playback security with respect to the playlist 120 by encrypting content 155 (e.g., content 155-1, content 155-2, content 155-3, etc.) referenced by the playlist 120. For example, the playlist manager 187 can encrypt content 155-1 via use of a first encryption key; encrypt content 155-2 via use of a second encryption key; encrypt content 155-3 via use of a third encryption key; and so on.

Note that certain content such as advertisements as referenced in the playlist 120 may not be encrypted. Accordingly, the playlist can include references to both encrypted and unencrypted types of content. As an added level of security, note that the playlist manager 187 can apply a hash function to each segment content 155 and include such a hashcode value in the playlist 120. Upon playback by the media player application 135, the content playback manager 125 can verify the integrity of the content segments by applying the hash function to the retrieved content (either the encrypted or unencrypted content) and checking that a hashcode value produced at the content playback manager 125 matches the hashcode value included in the playlist 120.

The playlist manager 187 provides notification to computer system 110-3 that the content 155 has been encrypted. For example, in yet further embodiments, the playlist manager 187 notifies computer system 110-3 (e.g., a server) of information that can be used to generate a decryption key to decrypt encrypted content 155. For example, as mentioned above, the playlist manager 187 can encrypt content such as content 155-1 via an encryption key. Such a key can be selected or provided by the publisher. The publisher has a corresponding decryption key that can be used to decrypt the encrypted content 155-1. Each segment of content 155 can be encrypted using a different encryption key.

In this example embodiment, the playlist manager 187 applies a hash function to its public key 185 to produce a hashed public key value. The hashed public key value is XOR'ed with the corresponding decryption key (which will be used for decrypting encrypted content 155) to produce a resulting VALUE. In other words, to produce VALUE1, the playlist manager 187 XORs the hashed public key value of the publisher with the decryption key for decrypting content 155-1; to produce VALUE2, the playlist manager 187 XORs the hashed public key value of the publisher with the decryption key for decrypting content 155-2; to produce VALUE3, the playlist manager 187 XORs the hashed public key value of the publisher with the decryption key for decrypting content 155-3; and so on.

The playlist manager 187 notifies the policy server 145 of the produced VALUE for each segment of content 155 that is encrypted. As mentioned above, this process is repeated for each encrypted segment of content. As will be discussed below in more detail, the content playback manager 125 and/or media player application 135 will obtain the appropriate VALUE from policy server 145 to produce a decryption key for decrypting and playback of content 155.

As mentioned above, computer system 110-2 enables playback of media content. For example, computer system 110-2 can include media player application 135 for displaying content 155 as specified by a corresponding playlist 120. The playlist 120 provides a mapping of content that is to be played by acknowledgment to a viewer. Among other functions, content playback manager 125 enables execution of a playlist 120 (e.g., a file referencing playable content) by the media player application 135.

Note that computer system 110-2 can be configured to retrieve a corresponding playlist 120 (e.g., a file) from different sources such as RSS feeds or other distribution points such as remote websites over the Internet. The publisher can make the playlist 120 available via storage of the playlist in a publicly accessible repository over a network.

Prior to execution of the digitally signed playlist 120 by a content playback manager 125 and/or media player application 135, the content playback manager 125 can verify the authenticity of the playlist 120 and that it has not been modified since being created by the publisher. For example, the content playback manager 125 can apply Adobe's public key (which can be encoded in the content playback manager 125) to decrypt the signed certificate 181 in the playlist 120. Decryption of the signed certificate 181 produces a hash code value of the publisher's public key 185 and/or the value of the publisher's public key 185.

To verify integrity of the playlist 120, the content playback manager 125 applies a hash function (e.g., the same hash function as applied by the playlist manager 187 to the playlist 120) to the playlist 120 to produce a hashcode value. The content playback manager 125 also applies a public key 185 to the digital signature information 182 to produce a decrypted digital signature value. The content playback manager 125 then verifies whether the produced playlist hashcode value equals the decrypted digital signature value. If so, the playlist 120 is authenticated and can be played via media player 135. Otherwise, the content playback manager 125 prevents playback of the playlist 120. Providing the digital signature information 182 along with the playlist 120 ensures that unauthorized persons have not tampered with the playlist 120 between a time of creating the playlist 120 and a time of execution of the playlist 120 by the computer system 110-2.

Assume in this example that the content playback manager 125 passes the above verification test. The content playback manager 125 then attempts playback of content as specified in the playlist 120 to a corresponding viewer. For example, the content playback manager can initiate retrieval of encrypted and/or unencrypted content 155 as specified by corresponding pointers (e.g., URLs) in the playlist 120.

In one embodiment, the content playback manager 125 applies an appropriate hash function (e.g., the same hash function that the playlist manager 187 used to produce the hashcode values for the content 155 as discussed above) to the retrieved content 155. If the hashcode value for corresponding content 155 matches the hashcode value as produced by the playlist manager 187 as discussed above (a value of which can be included in the playlist 120), then the content playback manager 125 enables playback of the content 155. Accordingly, upon playback of the playlist 120, the content playback manager 125 can retrieve a segment of content 155 as specified by a corresponding URL, apply a hash function to the segment of content, and play back decrypted content 155 as discussed above if there is an appropriate match of the newly produced hash value with a corresponding hash value included in the playlist 120 for that content 155. Thus, if the content as specified by a URL (in a playlist 120) changes over time, the content playback manager 125 and/or media player application 135 can prevent playback of the content.

As mentioned above, note that each segment of content as specified in the playlist 120 need not be hashed and included in playlist 120. For example, advertisement content, real-time data feeds of data, etc. as specified by references in the playlist 120 need not be hashed and included in the digital signature information 182. This enables the media player application 135 to play back the content as specified by the playlist 120 even though such content may change over time or reference content has not yet been produced.

For encrypted content 155, the content playback manager 125 can communicate with policy server 145 to obtain information for decrypting the content 155. As an example, assume that the content playback manager 125 attempts to initiate playback of content 155-1 as specified by URL1. In such a case, the content playback manager 125 notifies the policy server 145 of the desire to playback content 155-1 (as specified by URL1) for a respective viewer associated with media player 135. In such an instance, the policy server 145 searches for the appropriate VALUE (e.g., VALUE1) associated with content 155-1 and forwards VALUE1 to content playback manager 125 via a message 150.

VALUE1 (and each of other the other values) can be encrypted by policy server 145 and decrypted with a key known by the content playback manager 125.

In one embodiment, to reproduce a decryption key for decrypting content 155-1, the content playback manager 125 XORs VALUE1 (e.g., the information obtained from policy server 145) with a hash value of the publisher's public key 185. Recall that the content playback manager 125 can obtain the hash value of the publisher's public key 185 by applying the Adobe public key included in the content playback manager 125 to the signed certificate 181 received along with the playlist 120. The resulting decryption key can then be used to decrypt content 155-1. In a similar way, the content playback manager 125 can communicate with the policy server to obtain VALUE2, VALUE3, etc. to produce decryption keys for content 155-2, content 155-3, etc.

As previously discussed, the content playback manager 125 (e.g., video manager) and the media player application 135 operate on a computer system 110-2 (e.g., personal computer system, workstation, etc.).

Playback of the playlist 120 can be contingent upon a number of pre-conditions that must be met. For example, prior to play back of content as specified by playlist 120, the content playback manager 125 can communicate with a policy server 145 to authenticate the content playback manager 125 and/or the media player application 135. Proper authentication of the content playback manager 125 and/or the media player application 135 enables the computer system 110-2 to play back content as specified by the playlist 120. Without proper authentication, the content playback manager 125 and/or media player application 135 can prevent playback content as specified in the retrieved playlist 120.

For example, in one embodiment, the content playback manager 125 associated with computer system 110-2 supports communication with the policy server 145 to authenticate the content playback manager 125 and/or the media player application 135. As previously discussed, the policy server 145 can operate at a remote location over a network (e.g., the Internet) such as on computer system 110-3. In such an instance, the computer system 110-2 includes resources enabling communication over one or more networks.

The content playback manager 125 can verify signature information associated with the media player application 135, and return the signature information to the policy server 145. The policy server 145 verifies that the media player application 135 matches the media player application 135 specified in the policy.

In addition to verifying that the media player application 135 is authorized to view content 155 or playback playlist 120, the policy server 145 can also verify whether the version of the content playback manager 125 is an acceptable software version for playing the multimedia content as specified by references (e.g., URLs) in the playlist 120.

Note that although computer system 110-1 can be configured to provide functionality associated with playlist manager 187, computer system 110-2 can be configured to provide functionality associated with content playback manager 125, and computer system 110-3 can be configured to provide functionality associated with policy server 145, note that each of the different functionalities as described herein can be distributed and/or provided by other resources in a communication network.

Figure 2:
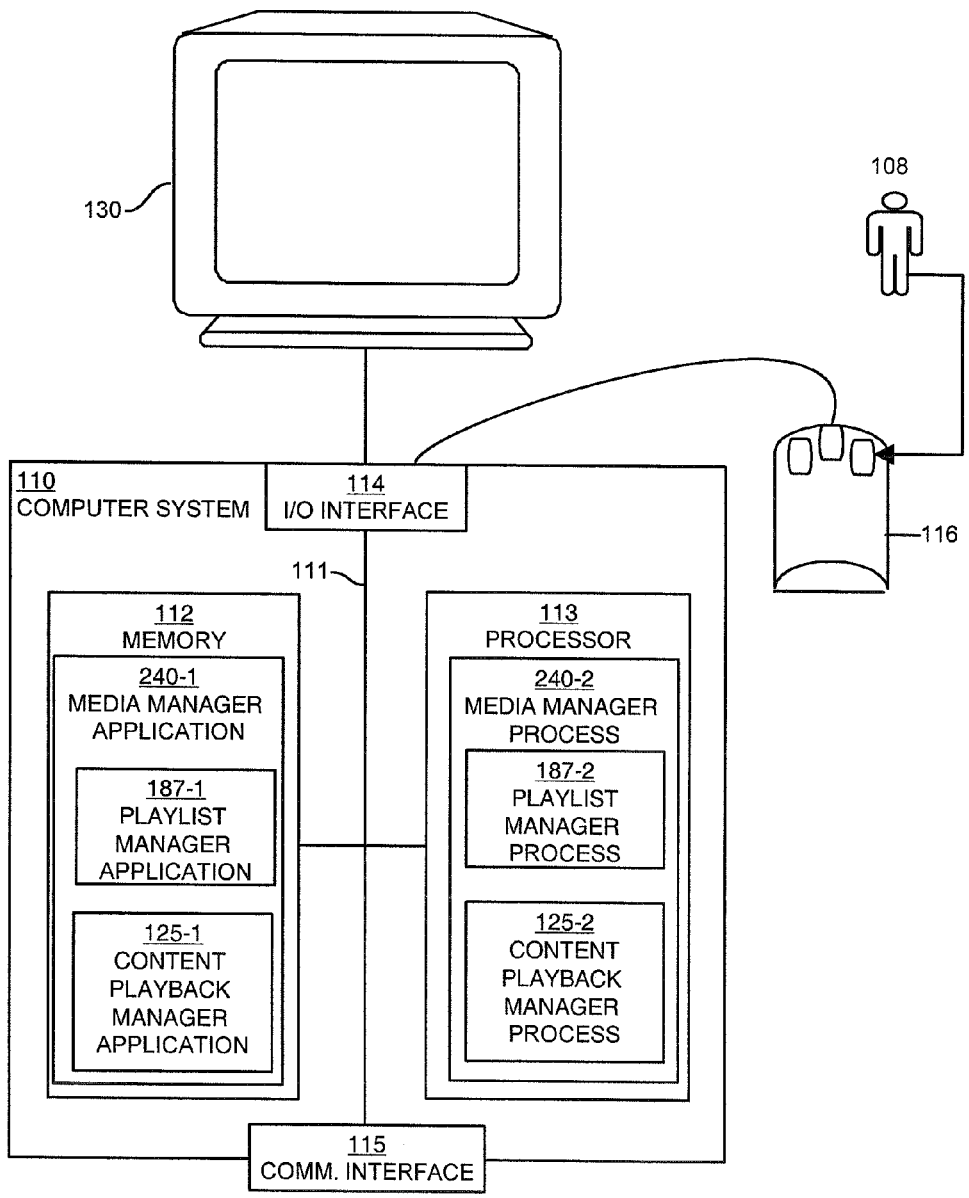
FIG. 2 illustrates an example embodiment of a computer system executing the media manager application, according to embodiments herein.

FIG. 2 is a block diagram illustrating an example architecture of a computer system 110 (e.g., either computer system 110-1 or computer system 110-2) that executes, runs, interprets, operates or otherwise supports execution of all or portions of media manager application 240-1 (e.g., software code including playlist manager application 187-1 and/or content playback manager application 125-1) to carry out embodiments as described herein. The computer system 110 may be any type of computerized device such as a personal computer, workstation, portable computing device, console, laptop, network terminal or the like. As previously discussed, playlist manager application 187-1 enables creation of playlists and related processes. Content playback manager application 125-1 enables playback of content and related processes.

An input device 116 (e.g., one or more user/developer controlled devices such as a keyboard, mouse, etc.) couples to processor 113 through I/O interface 114, and enables a user 108 to provide input commands, and generally control a graphical user interface that the media manager application 240-1 provides on the display 130 for creation and/or playback of playlists.

As shown in this example, the computer system 110 includes an interconnection mechanism 111 such as a data bus or other circuitry that couples a memory system 112, a processor 113, an input/output interface 114, and a communications interface 115. The communications interface 115 enables the computer system 110 to communicate with other devices (i.e., other computers) over one or more different types of networks.

The memory system 112 can be any suitable type of computer readable medium, and in this example, is encoded with media manager application 240-1, which include a combination of playlist manager application 187-1 and content playback manager 125-1 as explained herein. Any or all portions of the media manager application 240-1 may be embodied as software code such as data and/or logic instructions (e.g., code stored in the memory or on another computer readable medium such as a removable disk) that supports processing functionality according to different embodiments described herein.

During operation of the computer system 110, the processor 113 accesses the memory system 112 via the interconnect 111 in order to launch, run, execute, interpret or otherwise perform the logic instructions associated with media manager application 240-1. Execution of the media manager application 240-1 in this manner produces processing functionality as identified by media manager process 240-2. In other words, the media manager process 240-2 represents one or more portions or runtime instances of the media manager application 240-1 (or the entire media manager application 240-1) performing or executing within or upon the processor 113 in the computerized device 110 at runtime. The playlist manager process 187-2 represents one or more portions or runtime instances of the playlist manager application 187-1 (or the entire playlist manager application 187-1) performing or executing within or upon the processor 113 in the computerized device 110 at runtime. The content playback manager process 125-2 represents one or more portions or runtime instances of the content playback manager application 125-1 (or the entire content playback manager application 125-1) performing or executing within or upon the processor 113 in the computerized device 110 at runtime.

It is noted that example configurations disclosed herein include the media manager application 240-1 itself or portions thereof (i.e., in the form of un-executed or non-performing logic instructions and/or data). The media manager application 240-1 may be stored on a computer readable medium (such as a floppy disk), hard disk, electronic, magnetic, optical, or other computer readable medium. The media manager application 240-1 may also be stored in a memory system 112 such as in firmware, read only memory (ROM), or, as in this example, as executable code in, for example, Random Access Memory (RAM). In addition to these embodiments, it should also be noted that other embodiments herein include the execution of the media manager application 240-1 in the processor 113 as the media manager process 240-2. Those skilled in the art will understand that the computer system 110 may include other processes and/or software and hardware components, such as an operating system not shown in this example.

A display 130 need not be coupled directly to computer system 110. For example, the media manager application 240-1 can be executed on a remotely accessible computerized device via the communication interface 115. In this instance, a graphical user interface may be displayed locally to a user 108 (e.g., a publisher or user attempting to playback content as specified in a playlist) of the remote computer, and execution of the processing herein may be client-server based.

Further details of configurations explained herein will now be provided with respect to a flow chart of processing steps that show the operations disclosed herein to perform the media manager process 240-2.

Figure 3:
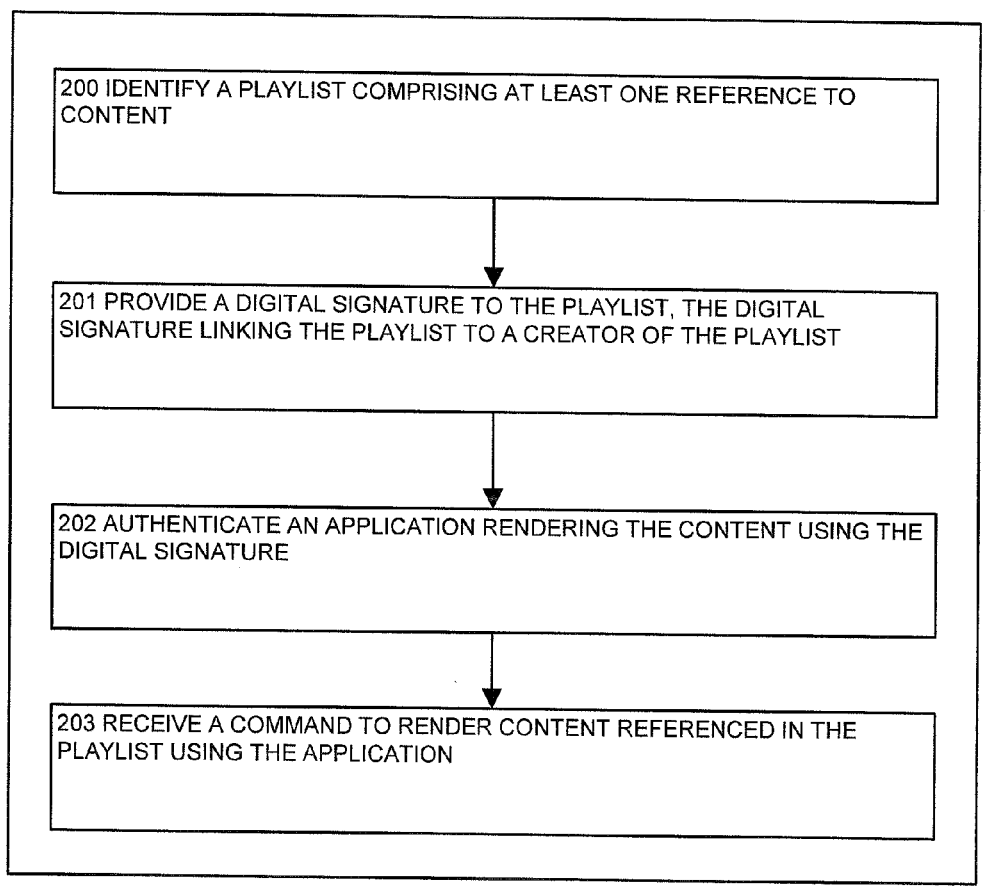
FIG. 3 illustrates a flowchart of a procedure performed by the system of FIG. 1, when the playlist manager process identifies a playlist comprising at least one reference to content, according to embodiments herein.

FIG. 3 is an embodiment of the steps performed by the media manager process 240-2 when it identifies a playlist 120 comprising at least one reference to content 155.

In step 200, the playlist manager process 187-2 of media manager process 240-2 identifies a playlist 120 comprising at least one reference to content 155. As previously discussed, the playlist 120 is comprised of references to URLs that point to content 155. The content 155 may include, but is not limited to, videos, audio, etc. For example, the playlist 120 may contain a reference to a URL that points to a (video) episode of a sitcom. The URL (i.e., pointer) identifies a web site of the TV station that supplies the sitcom. Thus, playback of the playlist 120 enables fans of the sitcom to view a particular episode of the sitcom whenever it is convenient. Additionally, the playlist 120 may include other URLs that reference to additional videos that exists on the web site of the TV station, for example, additional 'behind the scenes' video, such as interviews with the actors of the sitcom. In an example embodiment, the playlist 120 containing URLs may have the following format:

<seq>
<video src="http://sel.as-us.falkag.net/sel?id=127628734"/>
<video src="http://www.nbc.com/shows/heroes/episode_1_part_1.flv"/>
<video src="http://sel.as-us.falkag.net/sel?id=349857495"/>
<video src="http://www.nbc.com/shows/heroes/episode_1_part_2.flv"/>
<video src="http://sel.as-us.falkag.net/sel?id=034985098"/>
<video src="http://www.nbc.com/shows/heroes/episode_1_part_3.flv"/>
<video src="http://sel.as-us.falkag.net/sel?id=234857683"/>
<video src="http://www.nbc.com/shows/heroes/episode_1_part_4.flv"/>
<video src="http://sel.as-us.falkag.net/sel?id=093845093"/>
<video src="http://www.nbc.com/shows/heroes/episode_1_part_5.flv"/>
</seq>

In step 201, the playlist manager process 187-2 of media manager process 240-2 provides a digital signature to the playlist 120. As previously discussed, the digital signature information 182 links the playlist 120 to a creator of the playlist 120. The playlist 120 is digitally signed to ensure that, when the playlist 120 is rendered, the integrity of the playlist 120 has not been tampered with. The creator of the playlist 120 has a credential that is associated with a certification authority. This same certification authority can be embedded in the application 135 in a tamper resistant manner. Thus, the content playback manager 125-2 can ensure that only authorized media player applications 135 are able to render the playlist 120.

In step 202, the content playback manager process 125-2 of media manager process 240-2 authenticates an media player application 135 attempting to render content as specified by the playlist 120 and corresponding referenced content 155 using the digital signature information 182 associated with the playlist 120. Additionally, the content playback manager process 125-2 can initiate communication with the policy server 145 to authenticate the content playback manager 125 and/or the media player application 135. This can prevent any unauthorized applications 135 from rendering the playlist 120.

In step 203, the content playback manager process 135-2 of media manager process 240-2 receives a command to render the content referenced in the playlist 120 using the media player application 135. This command can be generated in response to a respective user requesting to play the playlist 120. As previously discussed, the command can be received based on input with respect to a graphical user interface. In one embodiment, prior to playback of the playlist 120, the media manager process 240-2 performs authentication between the policy server 145 and the content playback manager 125 and/or the application 135. The media manager process 240-2 also can verify the integrity of the playlist 120 before playing the content 155-1.

FIG. 4 is an embodiment of the steps performed by the playlist manager process 187-2 when it identifies a playlist 120 comprising at least one reference to content 155-1.

In step 204, the playlist manager process 187-2 of media manager process 240-2 identifies a playlist 120 comprising at least one reference to content 155. In an example embodiment, the playlist 120 may contain URLs that point to an assortment of videos, audio segments, etc.

In step 205, the playlist manager process 187-2 of media manager process 240-2 identifies content 155 in the playlist 120 as an advertisement. In an example embodiment, a playlist 120 may contain URLs pointing to videos along with URLs pointing to advertisements. The playlist manager process 187-2 protects the integrity of the playlist 120 to ensure that users 108 view the advertisements along with the videos in the playlist 120. Advertisers pay to have advertisements placed in the playlist 120, and want those advertisements viewed by users playing the playlist 120. For example, a playlist 120 for a radio station may include references to URLs containing songs. Interspersed between the songs (in the playlist 120) may be references to URLs containing (audio) advertisements. The security features as described herein prevent a user from avoiding playback of the advertisements.

Alternatively or additionally, in step 206, the playlist manager process 187-2 of media manager process 240-2 encrypts content 155 referenced in the playlist 120 using a policy carried out by computer systems 110. In an example embodiment, the playlist manager process 187-2 encrypts some or all of the content specified within a playlist 120. The playlist 120 may also contain advertisements. However, the playlist manager 187 may not encrypt the advertisements since these may change depending on the market in which the playlist 120 is rendered. For example, a playlist 120 containing videos and local advertisements will require different advertisements for different geological regions in which the playlist 120 is rendered. A playlist 120 containing advertisements for a car repair shop in San Francisco is only effective in the San Francisco area. When that playlist 120 is played in Miami, the advertisements in the playlist 120 may be changed to point to URLs for a real estate company in the Miami area.

FIG. 5 is continuation of FIG. 4 of an embodiment of the steps performed by the playlist manager process 187-2 when it encrypts at least one content 155-1 in the playlist 120 using a policy.

In step 207, the playlist manager process 187-2 of media manager process 240-2 provides a policy allowing anonymous user access to at least one content 155-1. In an example embodiment, the policy allows anonymous access to rendering the videos within the playlist 120 as long as the authentication between the content playback manager 125 and the policy server 145 are successful. For example, a user 108 may go a video rendering web site to view video clips. The video rendering web site may have an acceptable version of a content playback manager 125 and media player application 135. As long as the content playback manager 125 and media player application 135 authenticate with the policy server 145, the user 108 may view the videos on the video rendering web site without signing on to that web site. The content playback manager process 125-2 authenticates the integrity of the playlist 120, and authenticates the content playback manager 125 and/or media player application 135.

Alternatively, in step 208, the playlist manager process 187-2 of media manager process 240-2 provides a policy requiring authentication of an media player application 135 capable of rendering the content 155-1. In an example embodiment, the policy requires that the media player application 135 and the content playback manager 125 are authenticated before the video in the playlist 120 can be rendered using the media player application 135.

In step 209, the playlist manager process 187-2 of media manager process 240-2 provides an identification of the media player application 135 capable of rendering at least one content 155-1 within the policy. The policy used to encrypt the videos in the playlist 120 provides the identification of the media player application 135 that is to be authenticated.

Alternatively, in step 210, the playlist manager process 187-2 of media manager process 240-2 computes an encryption key using a credential provided to a creator of the playlist 120. The encryption key is used to encrypt the content 155-1. In an example embodiment, the encryption key is provided by the policy server 145. The encryption key is then XOR'd with a public hash key to produce a video encrypting key. The public hash key is contained within the credential that is provided to the creator of the playlist 120. Each of the videos in the playlist 120 is then encrypted using the video encrypting key.

Figure 6:
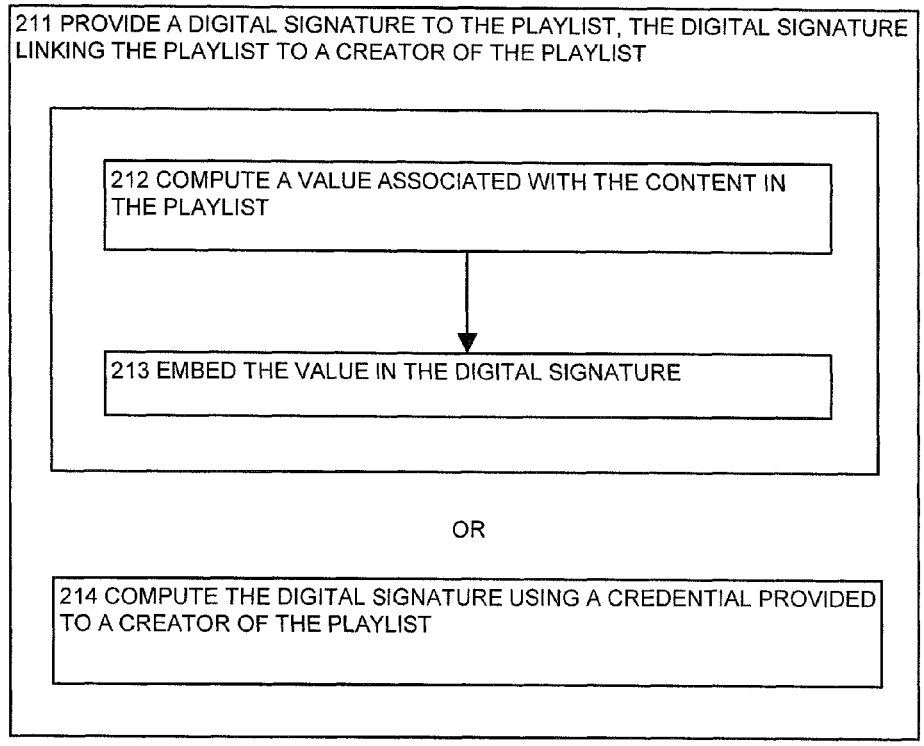
FIG. 6 illustrates a flowchart of a procedure performed by the system of FIG. 1, when the playlist manager process provides a digital signature to the playlist, the digital signature linking the playlist to a creator of the playlist, according to embodiments herein.

FIG. 6 is an embodiment of the steps performed by the playlist manager process 187-2 when it provides a digital signature to the playlist 120.

In step 211, the playlist manager process 187-2 of media manager process 240-2 provides a digital signature to the playlist 120. The digital signature links the playlist 120 to a creator of the playlist 120. The playlist 120 is digitally signed to ensure that, when the playlist 120 is rendered, the integrity of the playlist 120 has not been altered. The creator of the playlist 120 has a credential that is associated with a certification authority. This same certification authority is embedded in the media player application 135 in a tamper resistant manner. Thus, the playlist manager process 187-2 ensures that only authorized media player applications 135 render the playlist 120.

In step 212, the playlist manager process 187-2 of media manager process 240-2 computes a value associated with content 155-1 in the playlist 120. In an example embodiment, the playlist 120 is digitally signed with a digital signature. At the time the digital signature is computed, the playlist manager process 187-2 also computes a hash of each encrypted video.

In step 213, the playlist manager process 187-2 of media manager process 240-2 embeds the value in the digital signature. After computing a hash of each of the previously encrypted videos, the playlist manager process 187-2 embeds the hash in the digital signature. In an example embodiment, hashes of the advertisements within the playlist 120 are not included in the digital signature since the advertisements are expected to change over the course of time of the existence of the playlist 120.

Alternatively, in step 214, the playlist manager process 187-2 of media manager process 240-2 computes the digital signature using a credential provided to a creator of the playlist 120. The creator of the playlist 120 has a credential that is associated with a certification authority. This same certification authority is embedded in the media player application 135 in a tamper resistant manner. Thus, the playlist manager process 187-2 ensures that only authorized media player applications 135 render the playlist 120. The credential is also used to compute the digital signature.

Figure 7:
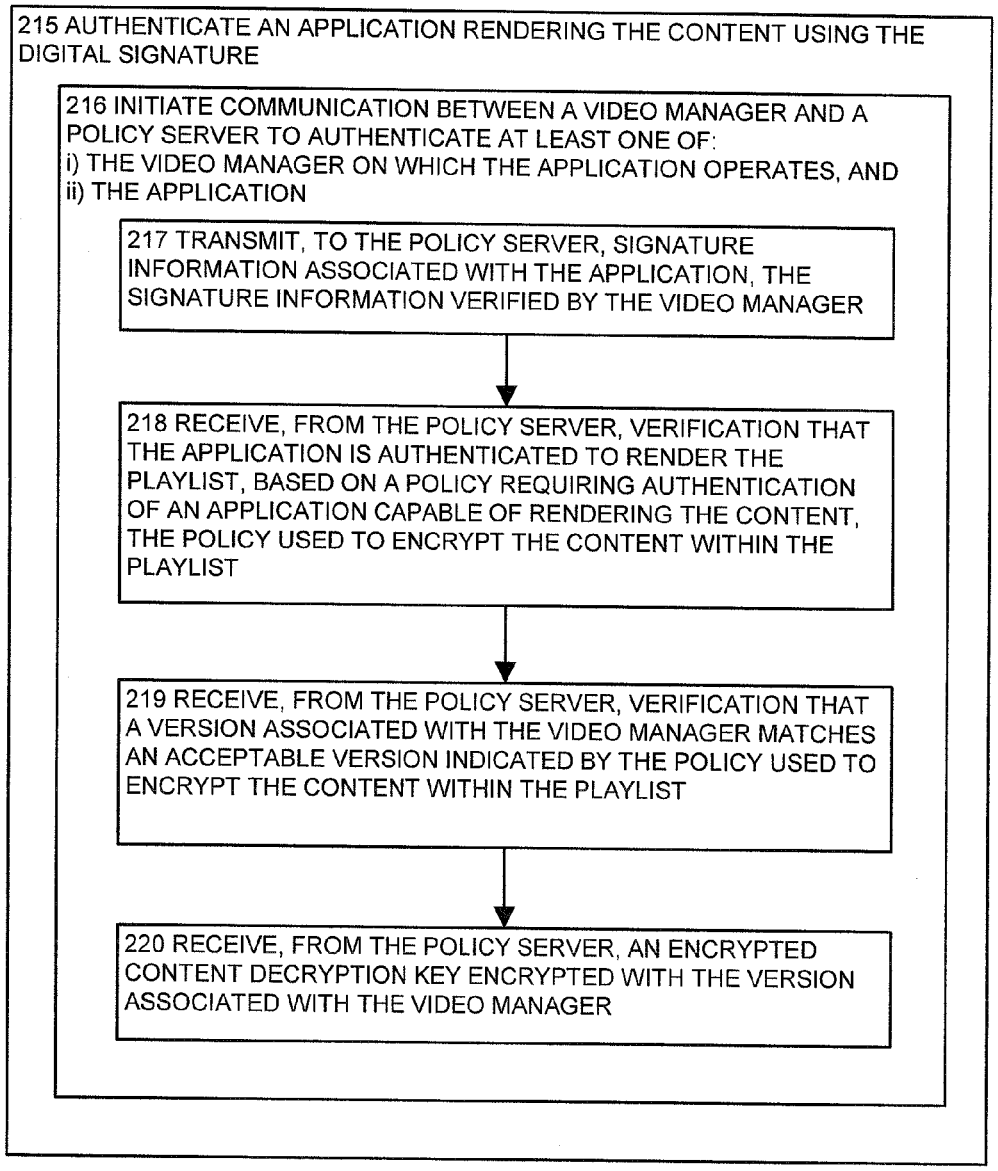
FIG. 7 illustrates a flowchart of a procedure performed by the system of FIG. 1, when the content playback manager process authenticates a media player application rendering content using the digital signature, according to one embodiment disclosed herein.

FIG. 7 is an embodiment of the steps performed by the content playback manager process 125-2 when it authenticates a media player application 135 rendering at least one content 155-1 using the digital signature.

In step 215, the content playback manager process 125-2 of media manager process 240-2 authenticates an media player application 135 rendering the content 155-1 using the digital signature. The content playback manager process 125-2 initiates communication between the content playback manager 125 and the policy server 145 to authenticate the content playback manager 125 and/or the media player application 135. This prevents any unauthorized media player applications 135 from rendering the playlist 120.

In step 216, the content playback manager process 125-2 of media manager process 240-2 initiates communication between a content playback manager 125 and a policy server 145 to authenticate at least one of:

i) the content playback manager 125 on which the media player application 135 operates, and ii) the media player application 135.

Prior to rendering the videos using the media player application 135, the content playback manager 125 and/or media player application 135 must be authenticated. In addition, the videos in the playlist 120 must be decrypted. The policy server 145 provides the key to decrypt the videos. The content playback manager 125 initiates communication with the policy server 145 to obtain the key that will be used to decrypt the videos.

In step 217, the content playback manager process 125-2 of media manager process 240-2 transmits, to the policy server 145, signature information associated with the media player application 135. The signature information is verified by the content playback manager 125. In an example embodiment, the policy server 145 requires authentication of the media player application 135 and the content playback manager 125, as specified in the policy that was used to encrypt the videos within the playlist 120. The content playback manager 125 verifies the signature of the media player application 135. Once the signature is verified, the content playback manager 125 returns the media player application's 135 signature information to the policy server 145.

In step 218, the content playback manager process 125-2 of media manager process 240-2 receives, from the policy server 145, verification that the media player application 135 is authenticated to render the playlist 120. The media player application 135 is authenticated based on a policy requiring authentication of an media player application 135 capable of rendering at least one content 155-1. The policy is used to encrypt the content 155-1 within the playlist 120. In other words, the policy server 145 verifies that the media player application 135 is the media player application 135 specified in the policy used to encrypt the videos.

In step 219, the content playback manager process 125-2 of media manager process 240-2 receives, from the policy server 145, verification that a version associated with the content playback manager 125 matches an acceptable version indicated by the policy used to encrypt the content 155-1 within the playlist 120. The policy server 145 verifies that the version of the content playback manager 125 matches with a content playback manager 125 version specified in the policy. The verification of the content playback manager 125 version is included with the information received from the policy server 145, indicating that the media player application 135 has been authenticated to render the playlist 120.

In step 220, the content playback manager process 125-2 of media manager process 240-2 receives, from the policy server 145, an encrypted content decryption key encrypted with the version associated with the content playback manager 125. In an example embodiment, if the version of the content playback manager 125 matches the content playback manager 125 version specified in the policy (that was used to encrypt the videos), the policy server 145 encrypts a content decryption key with a video manager version key that matches a version key embedded in the content playback manager 125. This provides implicit authentication of the content playback manager 125.

Figure 8:
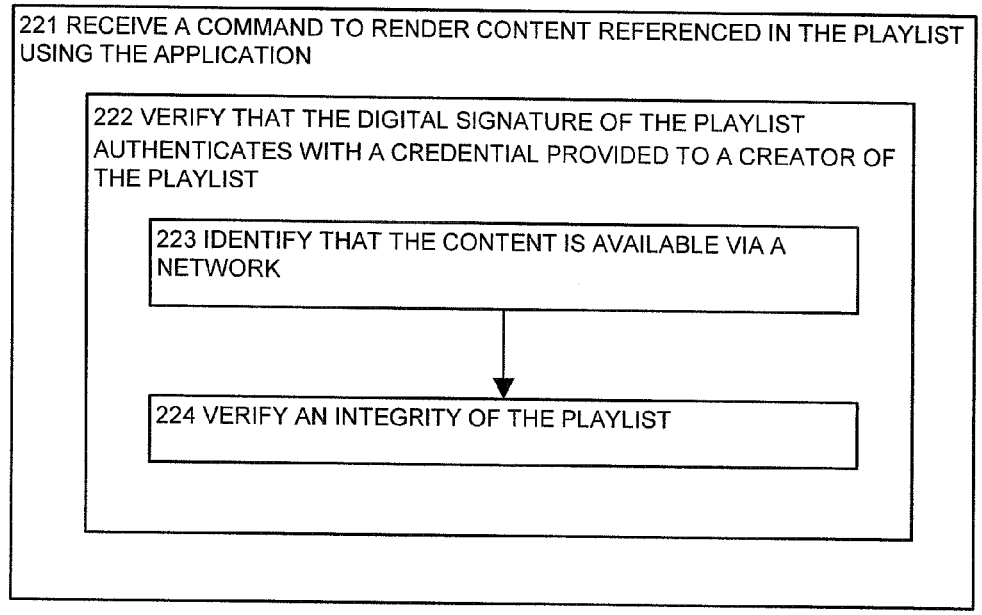
FIG. 8 illustrates a flowchart of a procedure performed by the system of FIG. 1, when the content playback manager process receives a command to render the playlist using the media player application, according to embodiments herein.

FIG. 8 is an embodiment of the steps performed by the content playback manager process 125-2 when it receives a command to render content referenced in the playlist 120 using the media player application 135.

In step 221, the content playback manager process 125-2 of media manager process 240-2 receives a command to render content referenced in the playlist 120 using the media player application 135. The media player application 135 operates on a content playback manager 125 that runs on a computer system 110-2. Also operating on the computer system 110-2 is the content playback manager process 125-2. A user 108, using a graphical user interface, invokes the media player application 135 to render (i.e., play) the content 155-1. The content playback manager process 125-2 performs authentication between the policy server 145 and the content playback manager 125 and/or media player application 135, and also verifies the integrity of the playlist 120 before playing the content 155-1.

In step 222, the content playback manager process 125-2 of media manager process 240-2 verifies that the digital signature of the playlist 120 authenticates with a credential provided to a creator of the playlist 120. Prior to rendering the video in the media player application 135, the secure content playback manager process 125-2 verifies the integrity of the playlist 120, linking the credential provided to a creator of the playlist 120 with a certification authority associated with the media player application 135.

In step 223, the content playback manager process 125-2 of media manager process 240-2 identifies that the content 155-1 is available via a network. In an example embodiment, the video to be rendered using the media player application 135 is downloaded real time over the network.

In step 224, the content playback manager process 125-2 of media manager process 240-2 verifies an integrity of the playlist 120. The content playback manager process 125-2 ensures that the playlist hasn't been altered.

FIG. 9 is an embodiment of the steps performed by the content playback manager process 125-2 when it verifies that the digital signature of the playlist 120 authenticates with a credential provided to a creator of the playlist 120.

In step 225, the content playback manager process 125-2 of media manager process 240-2 verifies that the digital signature of the playlist 120 authenticates with a credential provided to a creator of the playlist 120. Prior to rendering the video in the media player application 135, the content playback manager process 125-2 verifies the integrity of the playlist 120, linking the credential provided to a creator of the playlist 120 with a certification authority associated with the media player application 135.

In step 226, the content playback manager process 125-2 of media manager process 240-2 identifies that the content 155-1 is stored locally. In an example embodiment, a video has been downloaded and stored on a computer system 110.

In step 227, the content playback manager process 125-2 of media manager process 240-2 verifies that a first value associated with the content 155-1 matches a second value associated with the content 155-1. The second value is included in the digital signature. In an example embodiment, the digital signature ensures that a hash of the video matches a hash that is included in the digital signature of the playlist 120. During creation of the digital signature, a hash of the encrypted video was computed and embedded within the digital signature.

Alternatively, in step 228, the content playback manager process 125-2 of media manager process 240-2 determines that an authentication of the playlist 120 has failed. In an example embodiment, authentication process between the policy server 145 and the content playback manager 125 and/or media player application 135 has failed.

In step 229, the content playback manager process 125-2 of media manager process 240-2 rejects the command to render at least one content 155-1. If any of the authentication processes (i.e., the content playback manager 125 and/or the media player application 135) fail, then the playlist 120 isn't played within the media player application 135.

Figure 10:
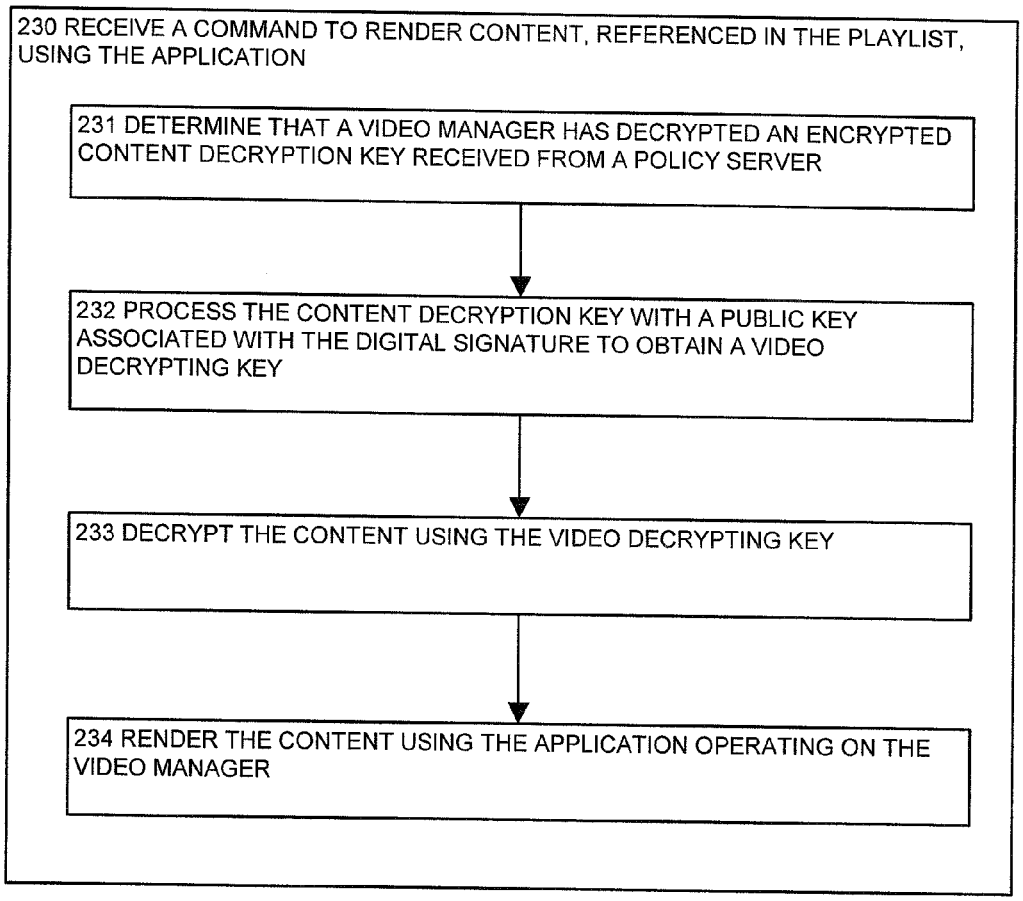
FIG. 10 illustrates a flowchart of a procedure performed by the system of FIG. 1, when the content playback manager process receives a command to render the playlist using the media player application, and determines that a content playback manager has decrypted an encrypted content decryption key received from a policy server, according to embodiments herein.

FIG. 10 is an embodiment of the steps performed by the content playback manager process 125-2 when it receives a command to render content referenced in the playlist 120 using the media player application 135.

In step 230, the content playback manager process 125-2 of media manager process 240-2 receives a command to render content referenced in the playlist 120 using the media player application 135. The media player application 135 operates on a content playback manager 125 that runs on a computer system 110-2. Also operating on the computer system 110-2 is the content playback manager process 125-2. A user 108, using a graphical user interface, invokes the media player application 135 to render (i.e., play) the content 155-1. The content playback manager process 125-2 performs authentication between the policy server 145 and the content playback manager 125 and/or media player application 135, and also verifies the integrity of the playlist 120 before playing the content 155-1.

In step 231, the content playback manager process 125-2 of media manager process 240-2 determines that a content playback manager 125 has decrypted an encrypted content decryption key received from a policy server 145. The content playback manager 125 receives a content decryption key from the policy server 145 after authentication of the media player application 135 and the content playback manager 125. The content playback manager 125 then decrypts the content decryption key.

In step 232, the content playback manager process 125-2 of media manager process 240-2 processes the content decryption key with a public key associated with the digital signature to obtain a video decrypting key. In an example embodiment, the content playback manager process 125-2, operating on the content playback manager 125, XORs the content decryption key with a public key hash present in the certificate that was used to digitally sign the playlist 120, to obtain a video decryption key. In an example embodiment, the certificate is passed in by the media player application 135.

In step 233, the content playback manager process 125-2 of media manager process 240-2 decrypts at least one content 155-1 using the video decrypting key. The content playback manager process 125-2 decrypts the video in the playlist 120 using the video decryption key that was obtained in step 232.

In step 234, the content playback manager process 125-2 of media manager process 240-2 renders at least one content 155-1 using the media player application 135 operating on the content playback manager 125. Once decrypted the content playback manager process 125-2 renders the video in the media player application 135.

Figure 11:
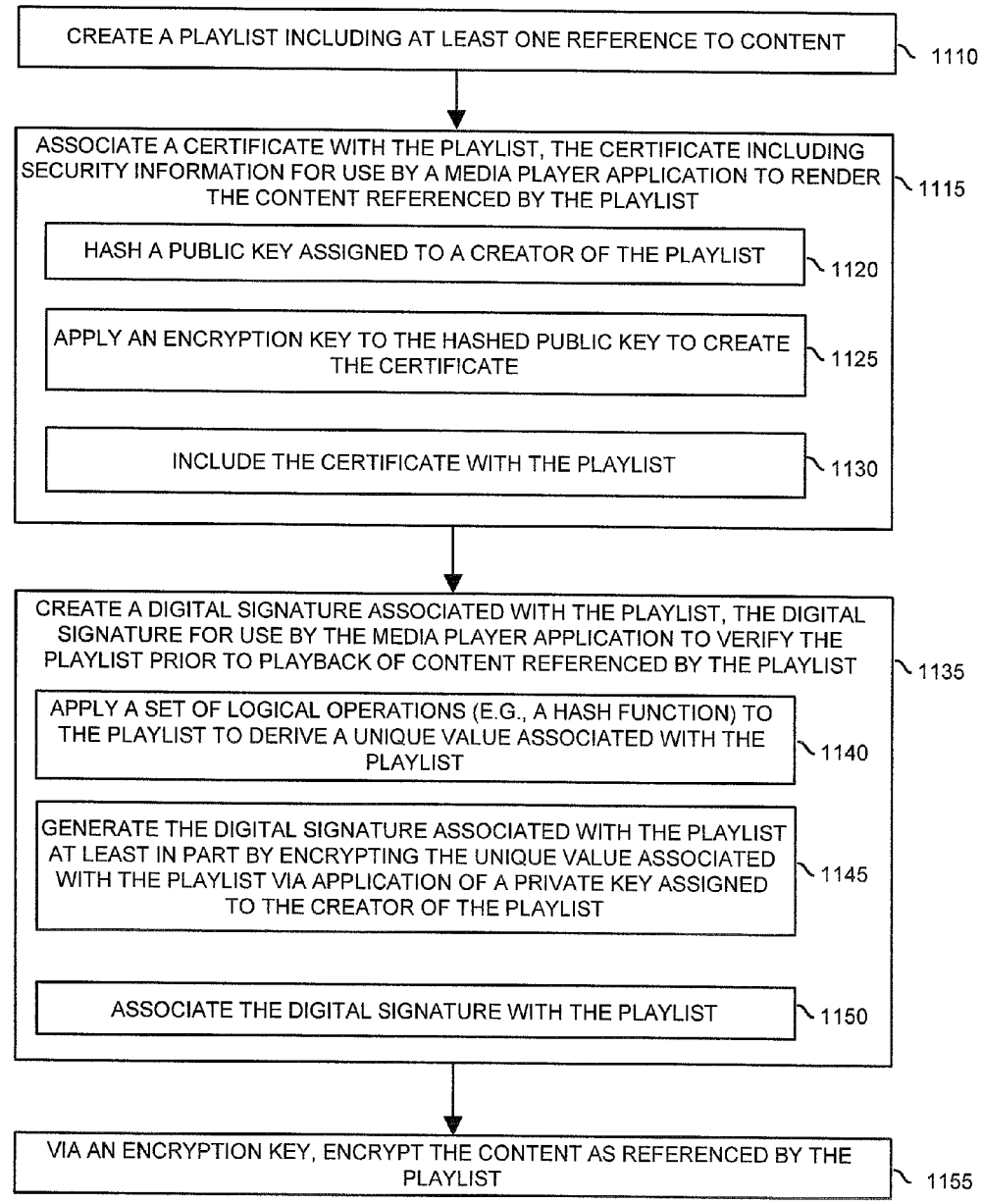
FIGS. 11-13 are diagrams illustrating example flowcharts according to embodiments herein.
Figure 12:
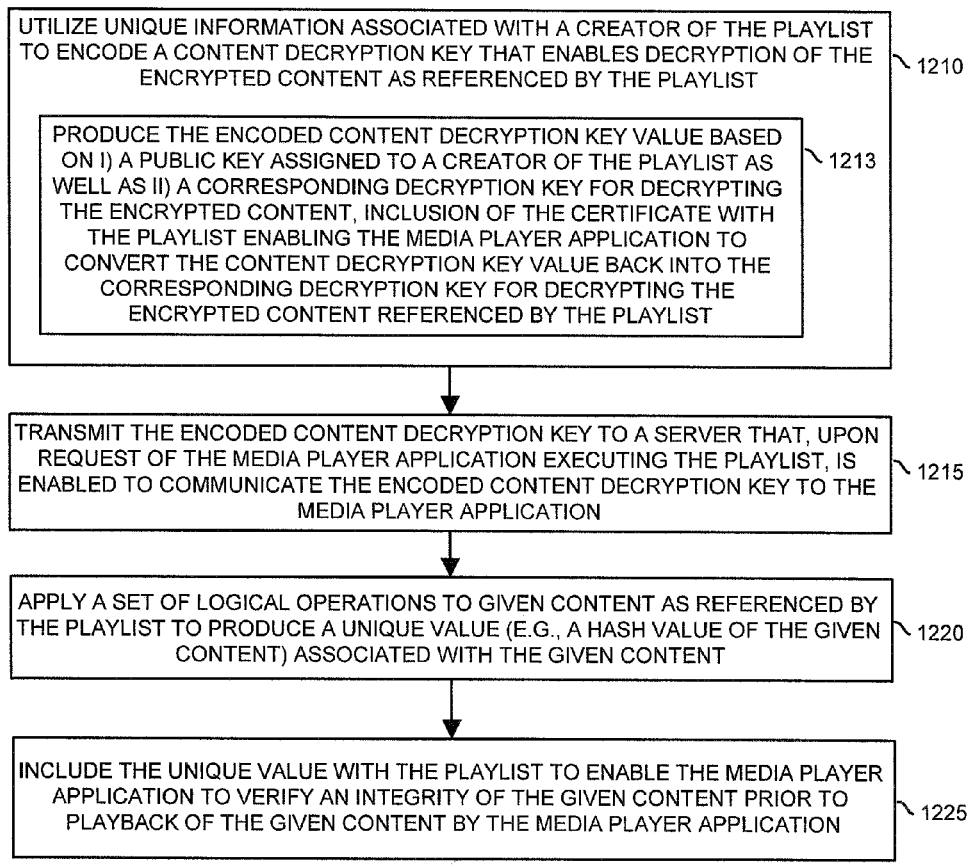

FIGS. 11 and 12 combine to form an example flowchart 1100 (e.g., flowchart 1100-1 and flowchart 1100-2) illustrating operations associated with the playlist manager 187 according to embodiments herein.

In step 1110, the playlist manager 187 creates a playlist 120 including at least one reference to content 155.

In step 1115, the playlist manager 187 associates a signed certificate 181 with the playlist 120. The signed certificate 181 can include security information for use by media player application 135 to render the content 155 referenced by the playlist 120.

In substep 1120 associated with step 1115, the playlist manager 187 hashes a public key 185 assigned to a creator of the playlist 120.

In substep 1125 associated with step 1115, the playlist manager 187 applies an encryption key (e.g., Adobe's private key) to the hashed public key value to create the signed certificate 181.

In substep 1130 associated with step 1115, the playlist manager 187 includes the certificate with the playlist In step 1135, the playlist manager 187 creates a digital signature 182 associated with the playlist 120. The digital signature can be used by the media player application 135 to verify the playlist 120 prior to playback of content 155 referenced by the playlist 120.

In substep 1140 of step 1135, the playlist manager 187 applies a set of logical operations (e.g., a hash function) to the playlist 120 to derive a unique value associated with the playlist 120.

In substep 1145 of step 1135, the playlist manager 187 generates the digital signature associated with the playlist 120 at least in part by encrypting the unique value associated with the playlist 120 via application of private key 186 assigned to the creator of the playlist 120.

In substep 1150 of step 1135, the playlist manager 187 associates the digital signature with the playlist 120.

In step 1155, the playlist manager 187 encrypts the content 155 as referenced by the playlist 120.

In step 1210, the playlist manager 187 utilizes unique information (e.g., the public key 185) associated with a creator of the playlist 120 to encode a content decryption key that enables decryption of the encrypted content 155 as referenced by the playlist 120.

In step 1213, the playlist manager 187 produces the encoded content decryption key value based on i) a public key 185 assigned to a creator of the playlist 120 as well as ii) a corresponding decryption key for decrypting the encrypted content. Inclusion of the certificate 181 with the playlist 121 enables the media player application 135 and/or the content playback manager 125 to convert the content decryption key value back into the corresponding decryption key for decrypting the encrypted content 155 referenced by the playlist 120.

In step 1215, the playlist manager 187 transmits the encoded content decryption key to a server (e.g., policy server 145) that, upon request of the media player application 135 executing the playlist 120, is enabled to communicate the encoded content decryption key to the media player application 135.

In step 1220, the playlist manager 187 applies a set of logical operations (e.g., a hash function) to given content as referenced by the playlist 120 to produce a unique value (e.g., a hash value of the given content) associated with the given content.

In step 1225, the playlist manager 187 includes the unique value (e.g., hash value) with the playlist 120 to enable the media player application 135 and/or the content playback manager 125 to verify an integrity of the given content prior to playback of the given content by the media player application 135.

Figure 13:
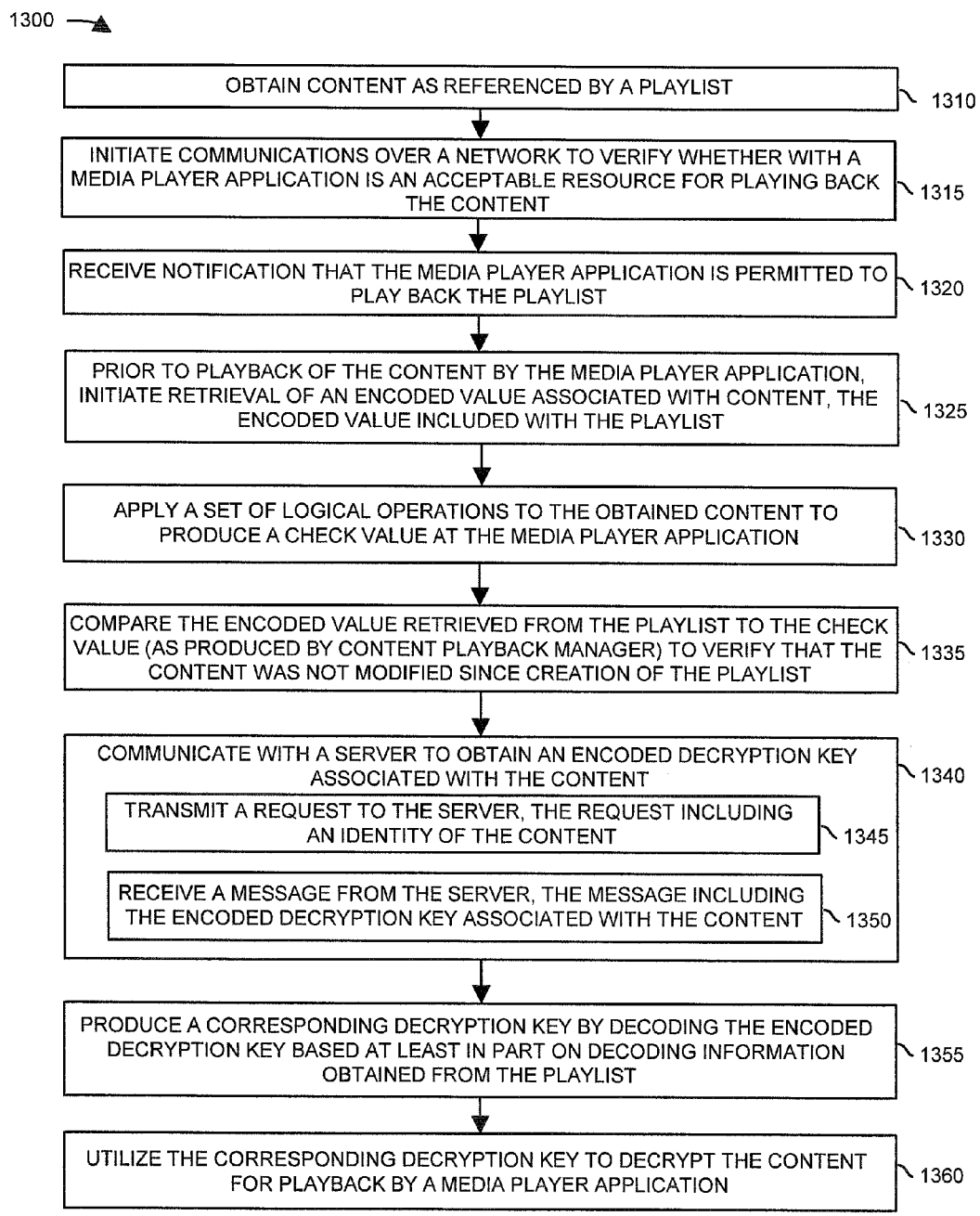

FIG. 13 is an example flowchart 1300 illustrating operations associated with a content playback manager 125 and/or media player application 135 according to embodiments herein.

In step 1310, the content playback manager 125 and/or the media player application 135 obtains content 155 as referenced by a playlist 120.

In step 1315, the content playback manager 125 and/or the media player application 135 initiates communications over a network to verify whether with a media player application 135 is an acceptable resource for playing back the content 155 as specified in the playlist 120.

In step 1320, the content playback manager 125 and/or the media player application 135 receives notification (e.g., based on a message received over a network) that the media player application 135 is permitted to play back the playlist 120.

In step 1325, prior to playback of the content 155 by the media player application 135, the content playback manager 125 and/or the media player application 135 initiates retrieval of an encoded value (e.g., a hash value included with the playlist 120) associated with content 155.

In step 1330, the content playback manager 125 and/or the media player application 135 applies a set of logical operations (e.g., a hash function) to the obtained content 155 to produce a check value at the media player application 135.

In step 1335, the content playback manager 125 and/or the media player application 135 compares the encoded value retrieved from the playlist 120 to the check value (as produced by content playback manager 125) to verify integrity of the content 155 such as that the content was not modified since creation of the playlist 120.

In step 1340, the content playback manager 125 and/or the media player application 135 communicates with a server (e.g., policy server 145) to obtain an encoded decryption key (e.g., one or more of values VALUE1, VALUE2, VALUE3, . . . ) associated with the content 155.

In step 1345, the content playback manager 125 and/or the media player application 135 transmits a request to the server. The request includes an identity of the content to be played by media player application 135.

In step 1350, the content playback manager 125 and/or the media player application 135 receives a reply message from the server (e.g., policy server 145). The reply message includes the encoded decryption key associated with the content 155.

In step 1355, the content playback manager 125 and/or the media player application 135 produces a corresponding decryption key (to decrypt content 155) by decoding the encoded decryption key (e.g., the VALUE received from policy server 145) based at least in part on decoding information obtained from the playlist 120.

In step 1360, the content playback manager 125 and/or the media player application 135 utilizes the corresponding decryption key to decrypt the content 155 for playback by a media player application 135.

While computer systems and methods have been particularly shown and described above with references to configurations thereof, it will be understood by those skilled in the art that various changes in form and details may be made therein without departing from the scope disclosed herein. Accordingly, the information disclosed herein is not intended to be limited by the example configurations provided above.

What is claimed is:

1. A method to be executed by a processor in communication with a computer-readable medium, the processor configured to execute the steps comprising:

receiving a playlist comprising a reference to encrypted content, the playlist further comprising a value for verifying the encrypted content and a digital signature for the playlist, the digital signature associating the playlist with a creator of the playlist;

verifying the digital signature authenticates with a credential of the creator of the playlist, and verifying the integrity of the playlist using the digital signature;

transmitting a verification request to a policy server, the verification request including application signature information and an application version for an application accessing the playlist;

initiating communication between a video manager and the policy server to authenticate the application;

receiving, from the policy server, verification of the authentication of the application, the verification based on the application signature and the application version; and receiving a request to play the playlist by the verified application, and the verified application responsive to receiving the request to play the playlist:

requesting, from the policy server, a decryption key for the encrypted content, receiving, from the policy server, a decryption key for the encrypted content, using the decryption key and the value for verifying the encrypted content, verifying the reference to the encrypted content and decrypting the encrypted content, and responsive to verifying the reference to the encrypted content, playing the decrypted content by the application.

2. The method of claim 1, wherein the content comprises an advertisement.

3. The method of claim 1, further comprising wherein encrypting the first referenced content referenced in the playlist comprises:

responsive to receiving the request to play the content, requesting anonymous user access to the encrypted content.

4. The method of claim 1, wherein decrypting the encrypted content referenced in the playlist comprises:

computing a verified decryption key using a credential provided to a creator of the playlist, the verified decryption key used to decrypt the encrypted content and decrypting the encrypted content using the verified decryption key.

5. The method of claim 1, wherein initiating communication between the video manager and the policy server to authenticate the application comprises:

verifying the application signature by the video manager;

receiving, from the policy server, a first verification that the application is authenticated to render the playlist, the first verification based on a policy requiring authentication of the application before playback of the encrypted content, the policy used to encrypt the first referenced content as specified within the playlist;

receiving, from the policy server, a second verification that a version associated with the video manager matches an acceptable version indicated by the policy used to encrypt the first referenced content within the playlist; and receiving, from the policy server, an encrypted content decryption key encrypted with the version associated with the video manager.

6. The method of claim 1, wherein verifying the digital signature comprises:

identifying that the encrypted content is available via a network; and using the value, verifying the reference to the encrypted content.

7. The method of claim 1, wherein verifying the digital signature comprises:

identifying that the first and second referenced content is stored locally; and using the value, verifying the encrypted content.

8. The method of claim 1, wherein verifying the integrity of the playlist comprises:

determining that the verification of the playlist has failed; and rejecting the command to playback the encrypted content.

9. The method of claim 1, wherein receiving the request to play the playlist by the verified application comprises:

determining that a video manager has decrypted an encrypted content decryption key received from a policy server; and processing the content decryption key with a public key associated with the digital signature to obtain the decryption key.

10. The method of claim 1, wherein the verifying the digital signature and transmitting the verification request are performed by a content manager process associated with the application.

11. A computerized device comprising:
a memory;
a processor;
a communications interface;
an interconnection mechanism coupling the memory, the processor and the communications interface;
wherein the memory is encoded with a media managing application that when executed on the processor is capable of managing media in a secure format on the computerized device by performing the operations of:
receiving a playlist comprising a reference to encrypted content, the playlist further comprising a value for verifying the encrypted content and a digital signature for the playlist, the digital signature associating the playlist with a creator of the playlist;
verifying the digital signature authenticates with a credential of the creator of the playlist, and verifying the integrity of the playlist using the digital signature;
transmitting a verification request to a policy server, the verification request including application signature information and an application version for an application accessing the playlist;
initiating communication between a video manager and the policy server to authenticate the application;
receiving, from the policy server, verification of the authentication of the application, the verification based on the application signature and the application version; and
receiving a request to play the playlist by the verified application, and the verified application responsive to receiving the request to play the playlist:
requesting, from the policy server, a decryption key for the encrypted content,
receiving, from the policy server, a decryption key for the encrypted content,
using the decryption key and the value for verifying the encrypted content, verifying the reference to the encrypted content and decrypting the encrypted content, and
responsive to verifying the reference to the encrypted content, playing the decrypted content by the application.

12. The computerized device of claim 11, wherein decrypting the encrypted content comprises computing a verified decryption key using a credential provided to a creator of the playlist, the verified decryption key used to decrypt the encrypted content, and decrypting the encrypted content using the verified decryption key.

13. The computerized device of claim 11, wherein the verifying the digital signature and transmitting the verification request are performed by a content manager process associated with the application.

14. A non-transitory computer readable medium encoded with computer programming logic that when executed on a process in a computerized device provides secure media managing, the medium comprising:
instructions for receiving a playlist comprising a reference to encrypted content, the playlist further comprising a value for verifying the encrypted content and a digital signature for the playlist, the digital signature associating the playlist with a creator of the playlist;
instructions for verifying the digital signature authenticates with a credential of the creator of the playlist, and verifying the integrity of the playlist using the digital signature;
instructions for transmitting a verification request to a policy server, the verification request including application signature information and an application version for an application accessing the playlist;
instructions for initiating communication between a video manager and the policy server to authenticate the application;
instructions for receiving, from the policy server, verification of the authentication of the application, the verification based on the application signature and the application version; and
instructions for receiving a request to play the content in the playlist by the verified application, and the verified application comprising instructions for, responsive to receiving the request to play the content:
requesting, from the policy server, a decryption key for the encrypted content,
receiving, from the policy server, a decryption key for the encrypted content,
using the decryption key and the value for verifying the encrypted content, verifying the reference to the encrypted content and decrypting the encrypted content, and
responsive to verifying the reference to the encrypted content, playing the decrypted content by the application.

15. The non-transitory computer-readable medium of claim 14, wherein the instructions for decrypting the encrypted content comprises instructions for computing a verified decryption key using a credential provided to a creator of the playlist, the verified decryption key used to decrypt the encrypted content, and instructions for decrypting the encrypted content using the verified decryption key.

16. The non-transitory computer-readable medium of claim 14, wherein the instructions for verifying the digital signature and the instructions for transmitting the verification request are part of a content manager process associated with the application.

* * * * *